(12) United States Patent
Jia et al.

(10) Patent No.: US 12,356,477 B2
(45) Date of Patent: Jul. 8, 2025

(54) COORDINATING JOINT TRANSMISSIONS AMONG MULTIPLE ACCESS POINTS

(71) Applicant: ZTE Corporation, Guangdong (CN)

(72) Inventors: Qichen Jia, Guangdong (CN); Bo Sun, Guangdong (CN); Kaiying Lv, Guangdong (CN); Zhiqiang Han, Guangdong (CN); Nan Li, Guangdong (CN)

(73) Assignee: ZTE Corporation, Shenzhen (CN)

(*) Notice: Subject to any disclaimer, the term of this patent is extended or adjusted under 35 U.S.C. 154(b) by 306 days.

(21) Appl. No.: 17/486,737

(22) Filed: Sep. 27, 2021

(65) Prior Publication Data

US 2022/0039184 A1    Feb. 3, 2022

Related U.S. Application Data

(63) Continuation of application No. PCT/CN2019/080224, filed on Mar. 28, 2019.

(51) Int. Cl.
*H04W 76/15* (2018.01)
*H04W 72/1263* (2023.01)
(Continued)

(52) U.S. Cl.
CPC ....... *H04W 76/15* (2018.02); *H04W 72/1263* (2013.01); *H04W 74/0816* (2013.01); *H04W 74/0841* (2013.01); *H04W 80/02* (2013.01)

(58) Field of Classification Search
CPC ..... H04W 76/15; H04W 80/02; H04W 72/20; H04W 84/12
See application file for complete search history.

(56) References Cited

U.S. PATENT DOCUMENTS 10,009,736 B1   6/2018   Chu et al.
10,924,955 B2   2/2021   Lim et al.
(Continued)

FOREIGN PATENT DOCUMENTS

CN    105247796 A       1/2016
EP     2846585 A1 *    3/2015    ............. H04B 7/155
(Continued)

OTHER PUBLICATIONS

Chinese office action issued in CN Patent Application No. 201980094942.1, dated Apr. 18, 2023, 19 pages. English translation included.

(Continued)

*Primary Examiner* — Pamit Kaur
(74) *Attorney, Agent, or Firm* — Perkins Coie LLP

(57) ABSTRACT

Methods, apparatus, and systems for coordinating joint transmissions among multiple access points are described. In one example aspect, a wireless communication method includes receiving, by a communication device, a first frame from a master access point or a first intermediate communication device. The first frame indicates a joint transmission to be performed by multiple access points. The first frame includes a scheduling information for a secondary access point to perform the joint transmission and an indicator directing the communication device to forward the scheduling information. The method also includes transmitting, by the communication device, a second frame to the secondary access point or a second intermediate communication device. The second frame includes the scheduling information for the secondary access point to perform the joint transmission.

18 Claims, 15 Drawing Sheets

(51) Int. Cl.
H04W 74/0816 (2024.01)
H04W 74/0833 (2024.01)
H04W 80/02 (2009.01)

(56) References Cited

U.S. PATENT DOCUMENTS

| | | | | |
|---|---|---|---|---|
| 2008/0107221 A1* | 5/2008 | Yamanaka | ............ | H04L 1/0001 375/371 |
| 2010/0098108 A1* | 4/2010 | Guo | ...................... | H04J 3/1605 370/475 |
| 2016/0044516 A1 | 2/2016 | Hedayat et al. | | |
| 2017/0055255 A1 | 2/2017 | Zhou et al. | | |
| 2017/0086193 A1* | 3/2017 | Park | ...................... | H04L 5/0055 |
| 2019/0150170 A1* | 5/2019 | Park | ...................... | H04W 74/08 370/329 |

FOREIGN PATENT DOCUMENTS

| EP | 3 043 486 A1 | 7/2016 |
|---|---|---|
| KR | 2015-0082558 A | 7/2015 |
| KR | 1020170140229 A | 12/2017 |
| WO | 2014074919 A1 | 5/2014 |
| WO | WO-2016109921 A1 * | 7/2016 |
| WO | 2018093132 A1 | 5/2018 |

OTHER PUBLICATIONS

European Search Report for EP Patent Application No. 19921834.8, dated Jun. 1, 2022, 9 pages.
Chinese office action issued in CN Patent Application No. 201980094942.1, dated Oct. 21, 2023, 16 pages. English translation included.
International Preliminary Report on Patentability issued in International Patent Application No. PCT/CN2019/080224, dated Sep. 28, 2021, 5 pages.
European Communication under Rule 71(3) EPC issued in EP Patent Application No. 19921834.8, dated Aug. 3, 2023, 42 pages.
International Search Report and Written Opinion mailed on Dec. 27, 2019 for International Application No. PCT/CN2019/080224, filed on Mar. 28, 2019 (7 pages).
European Communication under Rule 71(3) EPC issued in EP Patent Application No. 19921834.8, dated Jan. 31, 2024, 43 pages.
Chinese office action issued in CN Patent Application No. 201980094942.1, dated May 8, 2024, 16 pages. English translation included.
Chinese Notification to Complete Formalities of Registration issued in CN Patent Application No. 201980094942.1, dated Nov. 8, 2024, 4 pages. English translation included.
Korean office action issued in KR Patent Application No. 10-2021-7034821, dated Nov. 18, 2024, 9 pages. English translation included.
Korean notice of allowance issued in KR Patent Application No. 10-2021-7034821, dated May 20, 2025, 9 pages. English translation included.

* cited by examiner

COORDINATING JOINT TRANSMISSIONS AMONG MULTIPLE ACCESS POINTS

CROSS-REFERENCE TO RELATED APPLICATIONS

This application is a continuation of International Patent Application No. PCT/CN2019/080224, filed on Mar. 28, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for coordinating joint transmissions among multiple access points. In particular, techniques are disclosed to enable a station to trigger a joint transmission and to enable a secondary access point or a station to facilitate a joint transmission by relaying scheduling information from a master access point.

In one example aspect, a wireless communication method is disclosed. The method includes receiving, by a communication device, a first frame from a first network device. The first frame indicates a joint transmission to be performed by multiple access points. The first frame includes a scheduling information for a secondary access point to perform the joint transmission and an indicator directing the communication device to forward the scheduling information. The method also includes transmitting, by the communication device, a second frame to a second network device. The second frame includes the scheduling information for the secondary access point to perform the joint transmission.

In another example aspect, a wireless communication method is disclosed. The method includes accessing a medium by a station for performing a transmission and transmitting, by the station, a frame to multiple access points indicating a joint transmission to be performed by the multiple access points. The frame includes scheduling information for the multiple access points for performing the joint transmission.

In another example aspect, a wireless communication method is disclosed. The method includes receiving, by an access point, a frame from a communication device indicating a joint transmission to be performed by the access point. The frame includes a scheduling information for the access point. The method also includes transmitting, after the predetermined time duration, a joint transmission radio frame to a target station based on the scheduling information.

In another example aspect, a communication apparatus is disclosed. The apparatus includes a processor that is configured to implement an above-described method.

In yet another example aspect, a computer-program storage medium is disclosed. The computer-program storage medium includes code stored thereon. The code, when executed by a processor, causes the processor to implement a described method.

These, and other, aspects are described in the present document.

DETAILED DESCRIPTION

Section headings are used in the present document only to improve readability and do not limit scope of the disclosed embodiments and techniques in each section to only that section. Certain features are described using the example of Wi-Fi wireless protocol. However, applicability of the disclosed techniques is not limited to only Wi-Fi wireless systems.

In a wireless local area network (WLAN), common devices are classified into an access point and a station (STA). A WLAN basic service set (BSS) includes an access point (AP) and one or more stations (STAs). The AP typically has access or interface to a wired/wireless network that carries traffic in and out of the BSS. Generally, the STAs near the edge covered by the AP have poor link quality, which affects the transmission efficiency and transmission reliability between the AP and the STA. With the rapid development of wireless technology, applications impose higher performance and reliability requirements on the network. Joint transmissions by multiple APs can effectively improve transmission reliability and reduce delay. Wireless devices that support multi-AP configurations will gradually gain popularity. To facilitate joint transmissions among multiple APs, it is desirable to obtain scheduling information between multiple APs to ensure synchronization.

Figure 1:
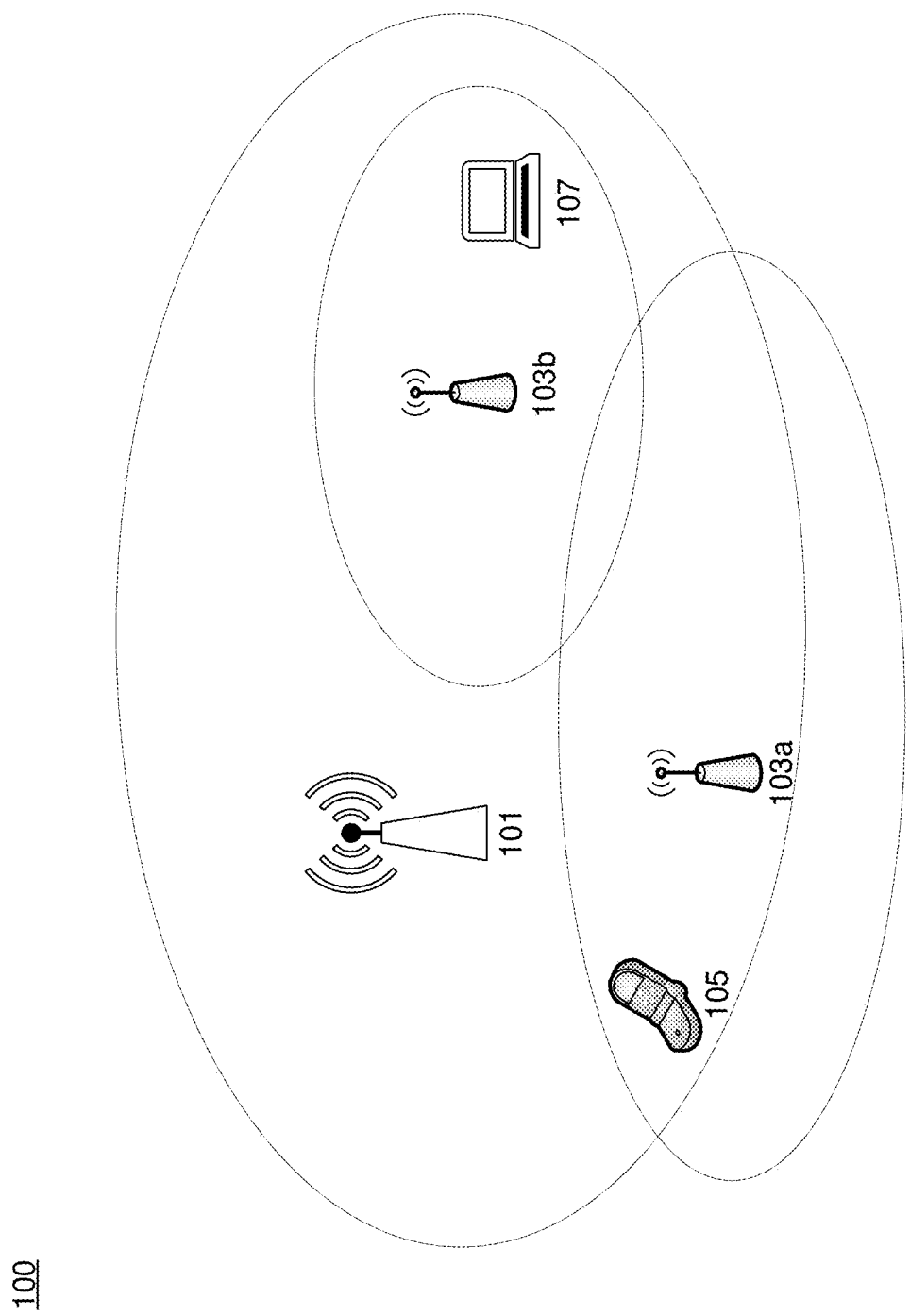
FIG. 1 illustrates an example architecture of a multi-AP system in accordance with one or more embodiments of the disclosed technology.

FIG. 1 illustrates an example architecture of a multi-AP system in accordance with one or more embodiments of the disclosed technology. A multi-AP system 100 includes a master AP (M-AP) 101 and a plurality of secondary APs (S-APs) 103*a*, 103*b*. Devices 105, 107 support joint transmissions by multiple APs in the multi-AP system 100. In this case, in order to successfully perform joint data transmissions, the M-AP 101 schedules and synchronizes the data transmissions among the M-AP and the S-APs.

Figure 2A:
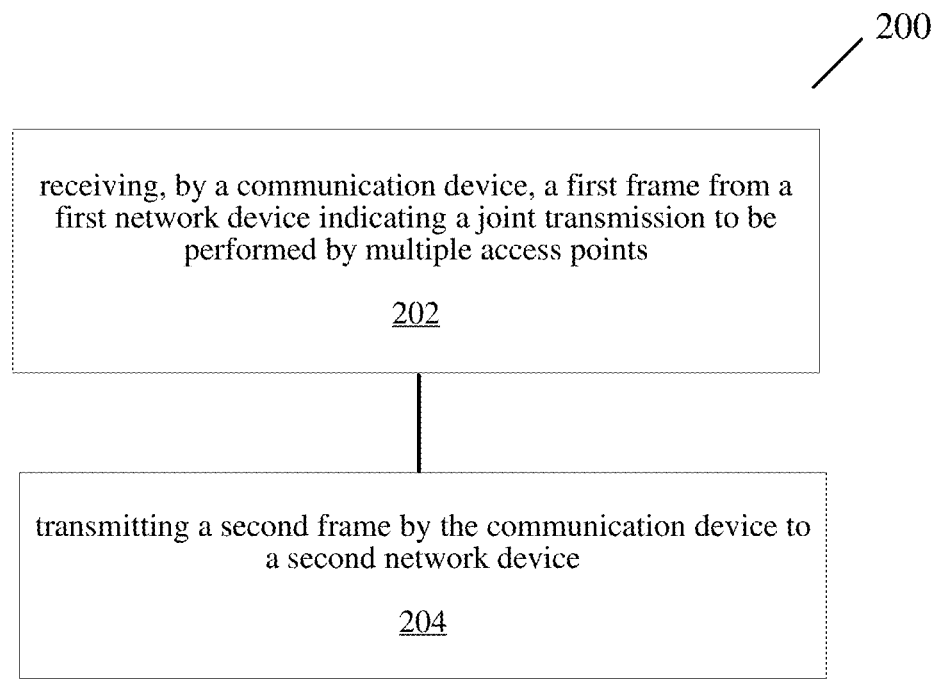
FIG. 2A is a flowchart representation of a wireless communication method in accordance with one or more embodiments of the disclosed technology.

FIG. 2A is a flowchart representation of a wireless communication method 200 in accordance with one or more embodiments of the disclosed technology. The method 200 includes, at 202, receiving, by a communication device (e.g., a station or a secondary AP), a first frame from a first network device (e.g., a master AP or an intermediate AP/STA) indicating a joint transmission to be performed by multiple access points. The first frame includes a scheduling information for a secondary access point to perform the joint transmission and an indicator directing the communication device to forward the scheduling information. A joint transmission may, for example, be a transmission that is simultaneously (e.g., occurring at the same time) performed by multiple access points. The method 200 includes, at 204, transmitting a second frame by the communication device to a second network device (e.g., the secondary AP or an intermediate AP/STA). The second frame includes the scheduling information for the secondary access point to perform the joint transmission.

Figure 2B:
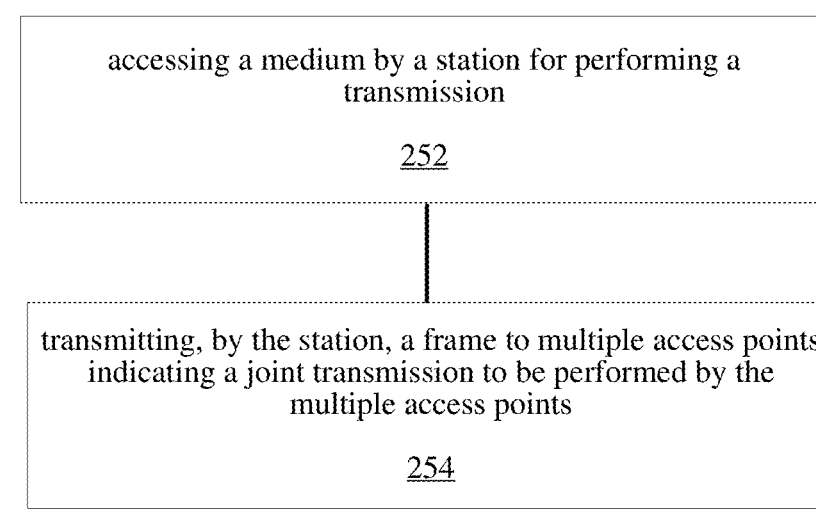
FIG. 2B is a flowchart representation of another wireless communication method in accordance with one or more embodiments of the disclosed technology.

FIG. 2B is a flowchart representation of a wireless communication method 250 in accordance with one or more embodiments of the disclosed technology. The method 250 includes, at 252, accessing a medium by a station for performing a transmission. The method 250 also includes, at 254, transmitting, by the station, a frame to multiple access points indicating a joint transmission to be performed by the multiple access points. The frame includes scheduling information for the multiple access points for performing the joint transmission.

Figure 3:
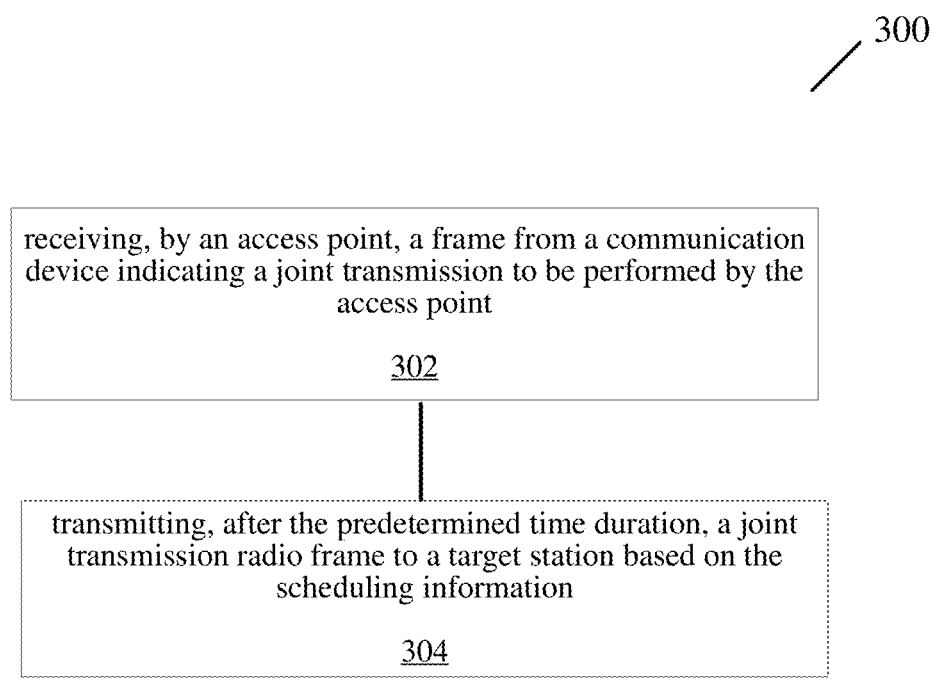
FIG. 3 is a flowchart representation of yet another wireless communication method in accordance with one or more embodiments of the disclosed technology.

FIG. 3 is a flowchart representation of another wireless communication method 300 in accordance with one or more embodiments of the disclosed technology. The method 300 includes, at 302, receiving, by an access point (e.g., a master access point), a frame from a communication device (e.g., a station or a secondary access point) indicating a joint transmission to be performed by the access point. The frame includes a scheduling information for the access point. The method 300 also includes, at 304, transmitting, after the predetermined time duration, a joint transmission radio frame to a target station based on the scheduling information.

Some examples of the disclosed techniques are described in the following example embodiments.

Embodiment 1

Figure 4:
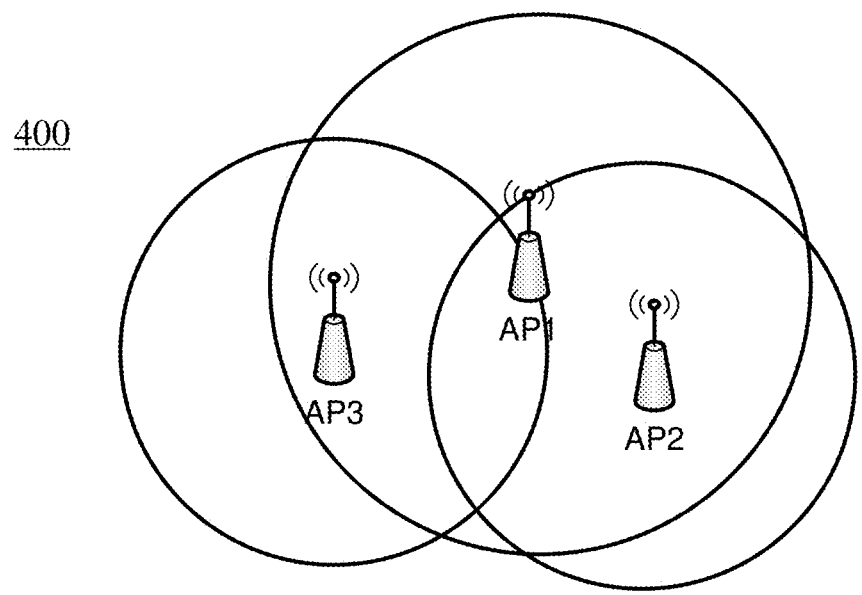
FIG. 4 illustrations an example multi-AP system in accordance with one or more embodiments of the disclosed technology.
Figure 4:
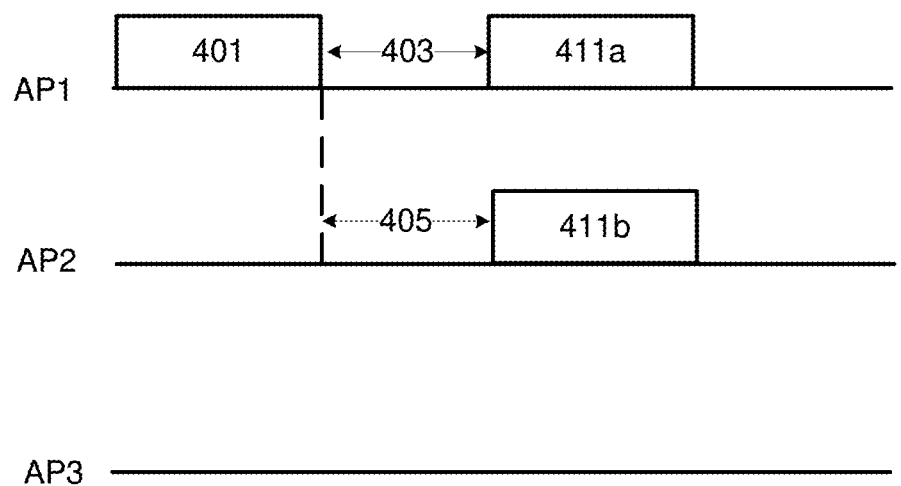

FIG. 4 illustrations an example multi-AP system 400 in accordance with one or more embodiments of the disclosed technology. The multi-AP system 400 comprises three APs. AP1 is an M-AP, and AP2 and AP3 are S-APs.

After AP1 gains access to the medium using a contention-based protocol, AP1 initiates a joint transmission with AP2. AP1 sends a scheduling frame 401 to AP2 to enable joint transmissions. The scheduling frame 401 can be a newly defined frame, such as a coordination trigger (CT) frame. The scheduling frame 401 can also leverage an existing frame format to include the scheduling information. After a time interval 403 (e.g., SIFS), AP1 transmits a joint transmission radio frame 411*a* to the STA.

When AP2 receives the scheduling frame 401, AP2 determines that the frame 401 is from AP1. The scheduling frame also includes an indicator, e.g., Overlapping BSS (OBSS) indication, directing AP2 to decode the frame. After decoding the scheduling frame 401, AP2 obtains the scheduling information. After a time interval 405 (e.g., SIFS), AP2 transmits a joint transmission radio frame 411*b* to the STA.

In this embodiment, AP3 does not receive the scheduling frame. AP3 continues to complete its current process and does not perform joint transmission with AP1.

Embodiment 2

Figure 5A:
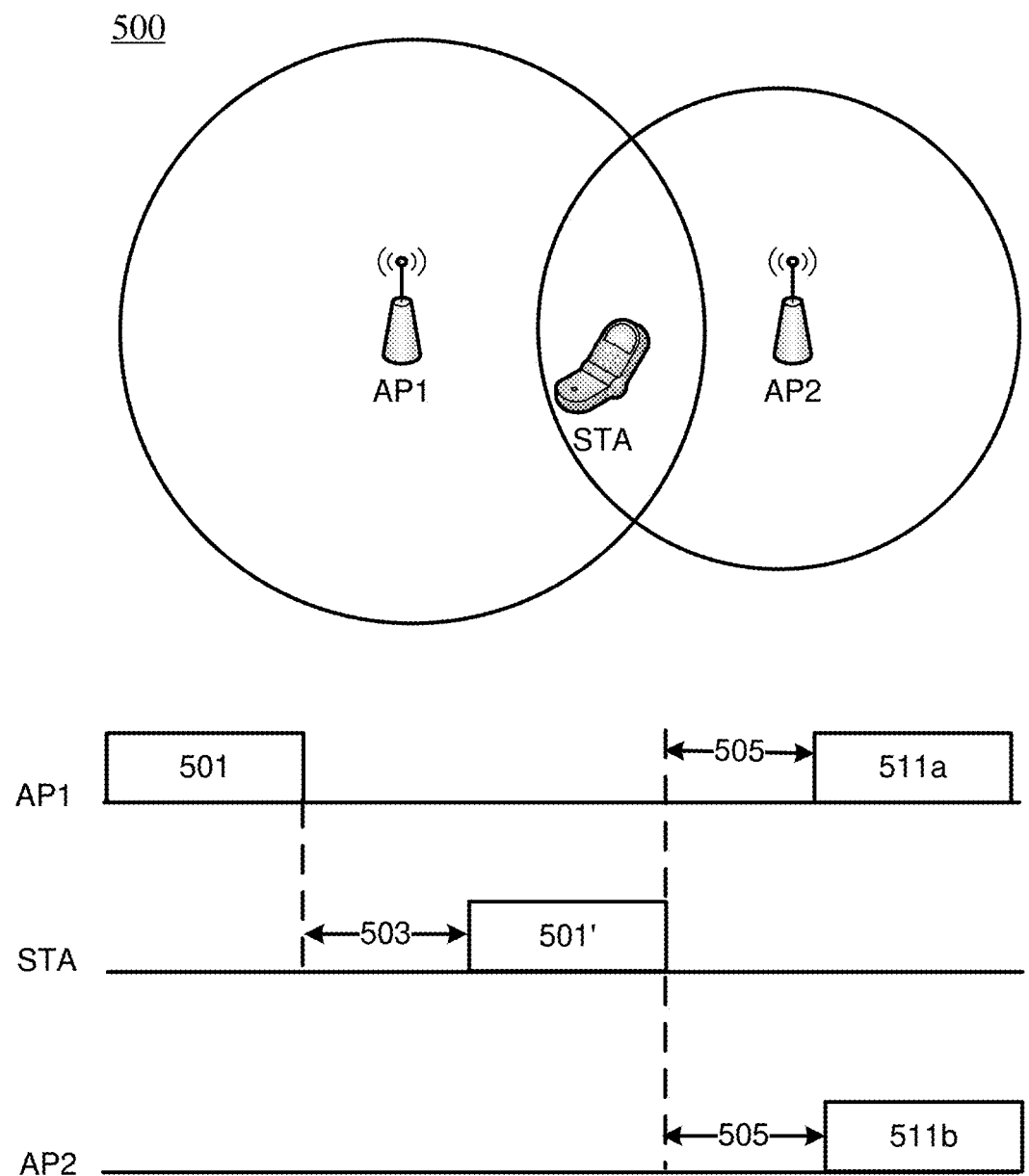
FIG. 5A illustrates another example multi-AP system in accordance with one or more embodiments of the disclosed technology.
Figure 5B:
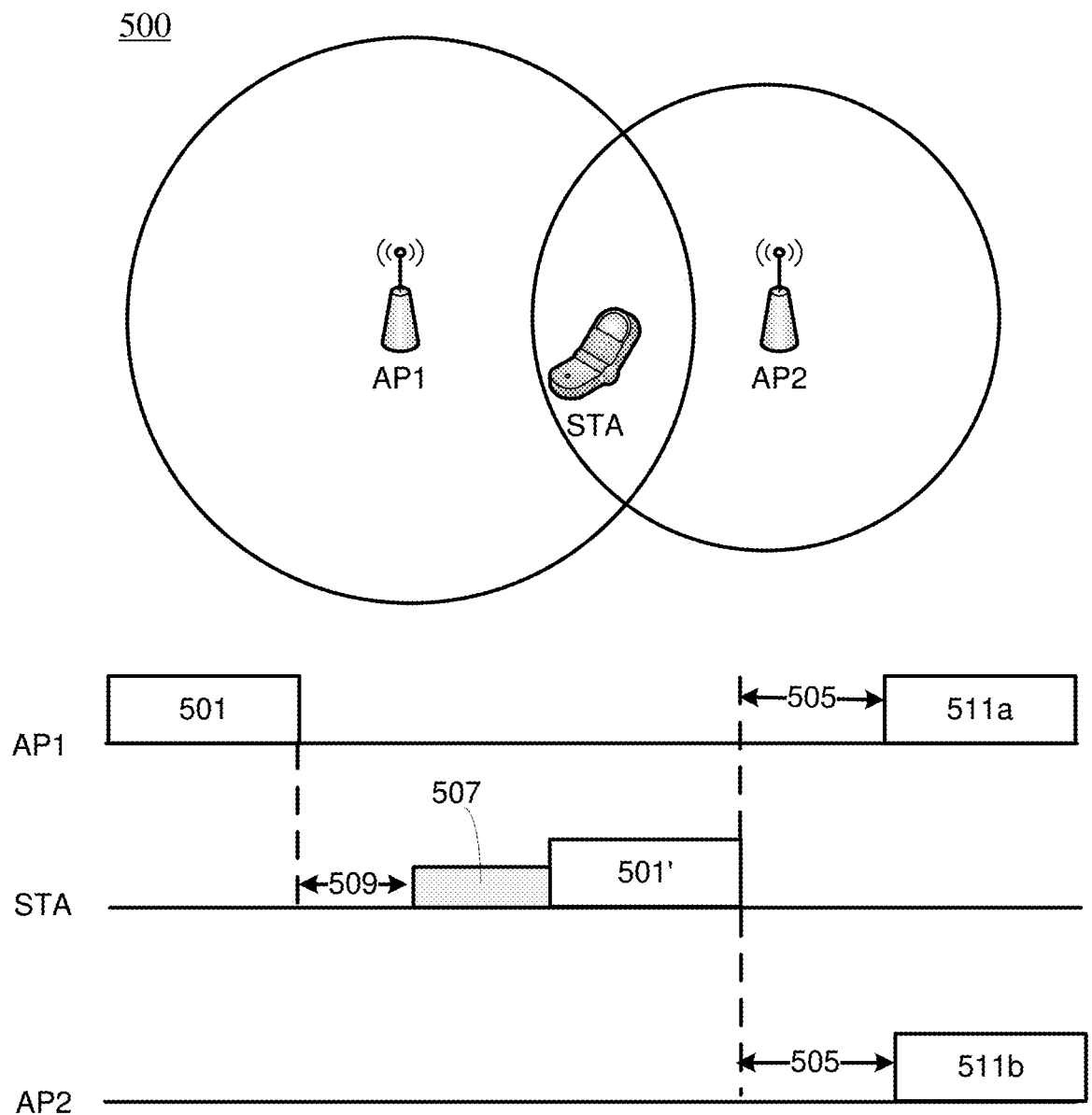
FIG. 5B illustrates another example multi-AP system in accordance with one or more embodiments of the disclosed technology.

FIGS. 5A-5B illustrate an example multi-AP system 500 in accordance with one or more embodiments of the disclosed technology. The multi-AP system 500 comprises two APs. AP1 is an M-AP, and AP2 is an S-AP. An STA can be used to relay information from M-AP to the S-AP.

After AP1 gains access to the medium using a contention-based protocol, AP1 sends a scheduling frame 501 to STA to enable joint transmissions. The scheduling frame 501 can be a newly defined frame, such as a CT frame. The scheduling frame 501 can also leverage an existing frame format to include the scheduling information. The scheduling frame 501 includes scheduling information for the AP2, such as parameters required by the physical (PHY) layer and the Medium Access Control (MAC) layer of AP2. The scheduling information can help synchronize the transmissions by AP1 and AP2. The scheduling frame 501 also includes a frame forwarding indication to direct the STA to forward/relay the scheduling information.

In some embodiments, the scheduling frame 501 includes a sequence number of the first data frame to be transmitted. In some embodiments, the scheduling frame 501 includes a buffer address of the data frames to be transmitted. The scheduling frame 501 may also indicate a status of the buffer in which the data frames are stored. In some embodiments, the STA can estimate the carrier frequency offset (CFO) during the scheduling frame and shift the phase of subsequently received data.

After receiving the scheduling frame 501, the STA determines, based on the frame forwarding indication, that the information in the scheduling frame 501 needs to be forwarded to AP2. The STA generates a new scheduling frame

501' by partially or completely copying the received frame 501. The STA then performs either of the following operations:

1. As shown in FIG. 5A, the STA relays the scheduling information to AP2 by sending the new scheduling frame 501' after a time interval 503 (e.g., SIFS). During the time interval 503, the STA suspends any Clear Channel Assessment (CCA).

2. As shown in FIG. 5B, the STA contends the medium for transmitting the scheduling frame 501' using an access category. The levels of priority in contention-based channel access are called access categories (ACs). The contention window (CW) can be set according to the traffic expected in each access category, with a wider window needed for categories with heavier traffic. After gaining medium access, the STA transmits the scheduling information to AP2 by sending the new scheduling frame 501' after a back-off interval 507. It is noted that the priority level associated with the access category is high enough to ensure that the length of a time interval, such as the arbitration interframe space (AIFS), plus the back-off interval is shorter than how long the data for joint-transmission is buffered in the AP2.

After receiving the scheduling frame, AP1 detects that it is a frame forwarded by the STA and sends a joint transmission radio frame to a target station after a time interval 505 (e.g., SIFS). During the time interval 505, AP1 suspends any Clear Channel Assessment (CCA).

After AP2 receives the scheduling frame 501', AP2 obtains the scheduling information after decoding the frame. After a time interval 505 (e.g., SIFS), AP2 sends a joint transmission radio frame 511b to the target station. During the time interval 505, the AP2 suspends any Clear Channel Assessment (CCA).

When AP2 fails to receive the scheduling frame 501', AP2 continues to complete the current process and does not perform joint transmission with AP1.

Embodiment 3

Figure 6A:
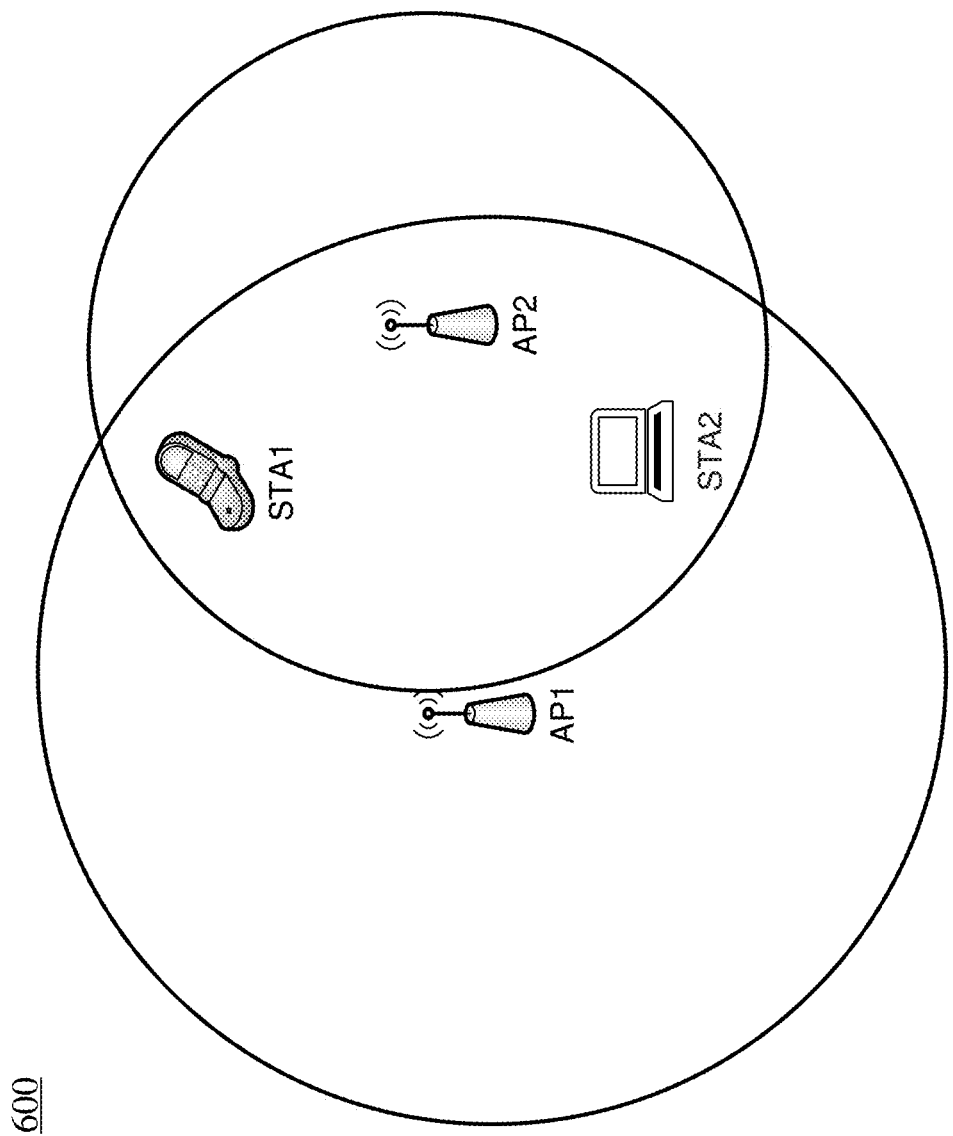
FIG. 6A illustrates an example multi-AP system in accordance with one or more embodiments of the disclosed technology.
Figure 6B:
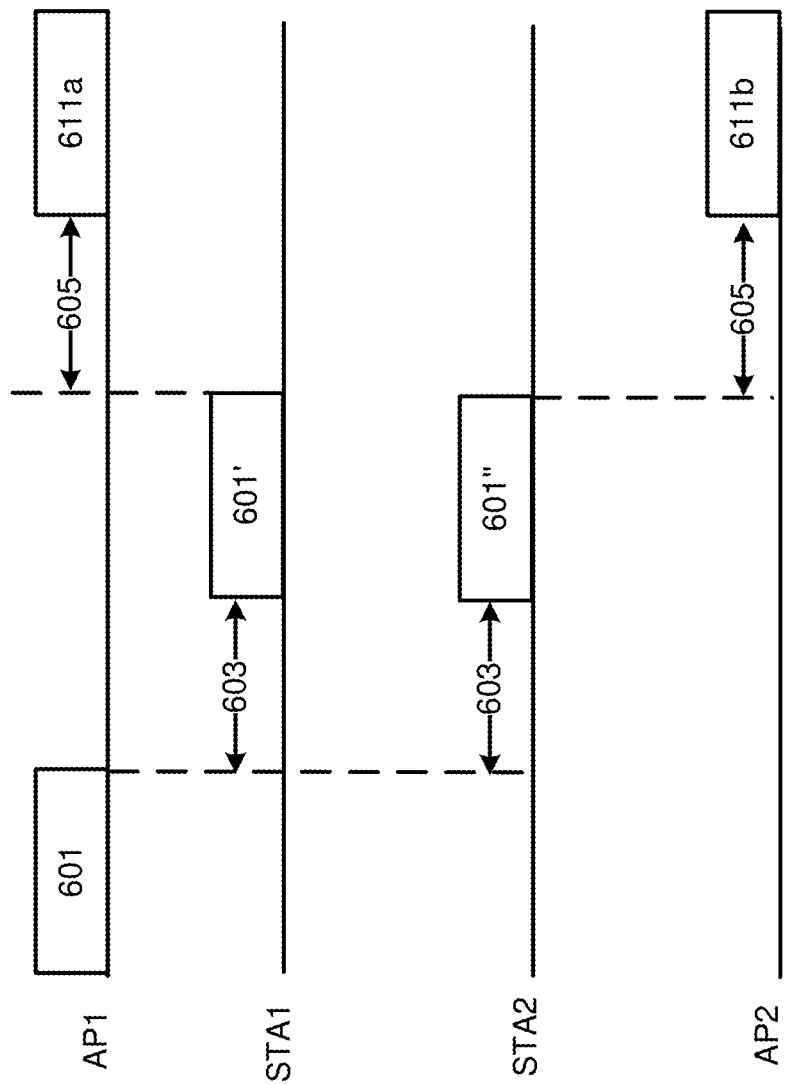
FIG. 6B illustrates an example of transmission corresponding to FIG. 6A in accordance with one or more embodiments of the disclosed technology.

FIGS. 6A-6B illustrate an example multi-AP system 600 in accordance with one or more embodiments of the disclosed technology. The multi-AP system 600 comprises two APs. AP1 is an M-AP, and AP2 is an S-AP. Multiple STAs can be used to relay information from M-AP to the S-AP.

After AP1 gains access to the medium using a contention-based protocol, AP1 sends a scheduling frame 601 to STA1 and STA2 simultaneously to enable joint transmissions. The scheduling frame 601 can be a newly defined frame, such as a CT frame. The scheduling frame 601 can also leverage an existing frame format to include the scheduling information. The scheduling frame 601 includes scheduling information for the AP2, such as parameters required by the PHY layer and the MAC layer of AP2. The scheduling information can help synchronize the transmissions by AP1 and AP2. The scheduling frame 601 also includes a frame forwarding indication to direct the STAs to forward/relay the scheduling information.

In some embodiments, the scheduling frame 601 includes a sequence number of the first data frame to be transmitted. In some embodiments, the scheduling frame 601 includes a buffer address of the data frames to be transmitted. The scheduling frame 601 may also indicate a status of the buffer in which the data frames are stored. In some embodiments, the STA1 and STA2 can estimate the carrier frequency offset (CFO) during the scheduling frame and shift the phase of subsequently received data.

After receiving the scheduling frame 601, the STA1 and the STA2 determines, based on the frame forwarding indication, that the information in the scheduling frame 601 needs to be forwarded to AP2. Both STA1 and STA2 generate a new scheduling frame 601' and 601" by partially or completely copying the received frame 601. As shown in FIG. 6B, STA1 relays the scheduling information to AP2 by sending the new scheduling frame 601' after a time interval 603 (e.g., SIFS). At the same time, STA2 relays the scheduling information to AP2 by sending the new scheduling frame 601" after a time interval 603 (e.g., SIFS). During the time interval 603, both STAs suspend any Channel Assessment (CCA).

After receiving the scheduling frame 601' or 601", AP1 detects that it is a frame forwarded by the STA(s) and sends a joint transmission radio frame to a target station after a time interval 605 (e.g., SIFS). During the time interval 605, AP1 suspends any Clear Channel Assessment (CCA).

When AP2 receives the scheduling frame 601' or 601", AP2 obtains the scheduling information after decoding the frame. After a time interval 605 (e.g., SIFS), AP2 sends a joint transmission radio frame 511b to the target station. During the time interval 605, the AP2 suspends any Clear Channel Assessment (CCA).

When AP2 does not receive the scheduling frame 601' or 601", AP2 continues to complete the current process and does not perform joint transmission with AP1.

Embodiment 4

Figure 7A:
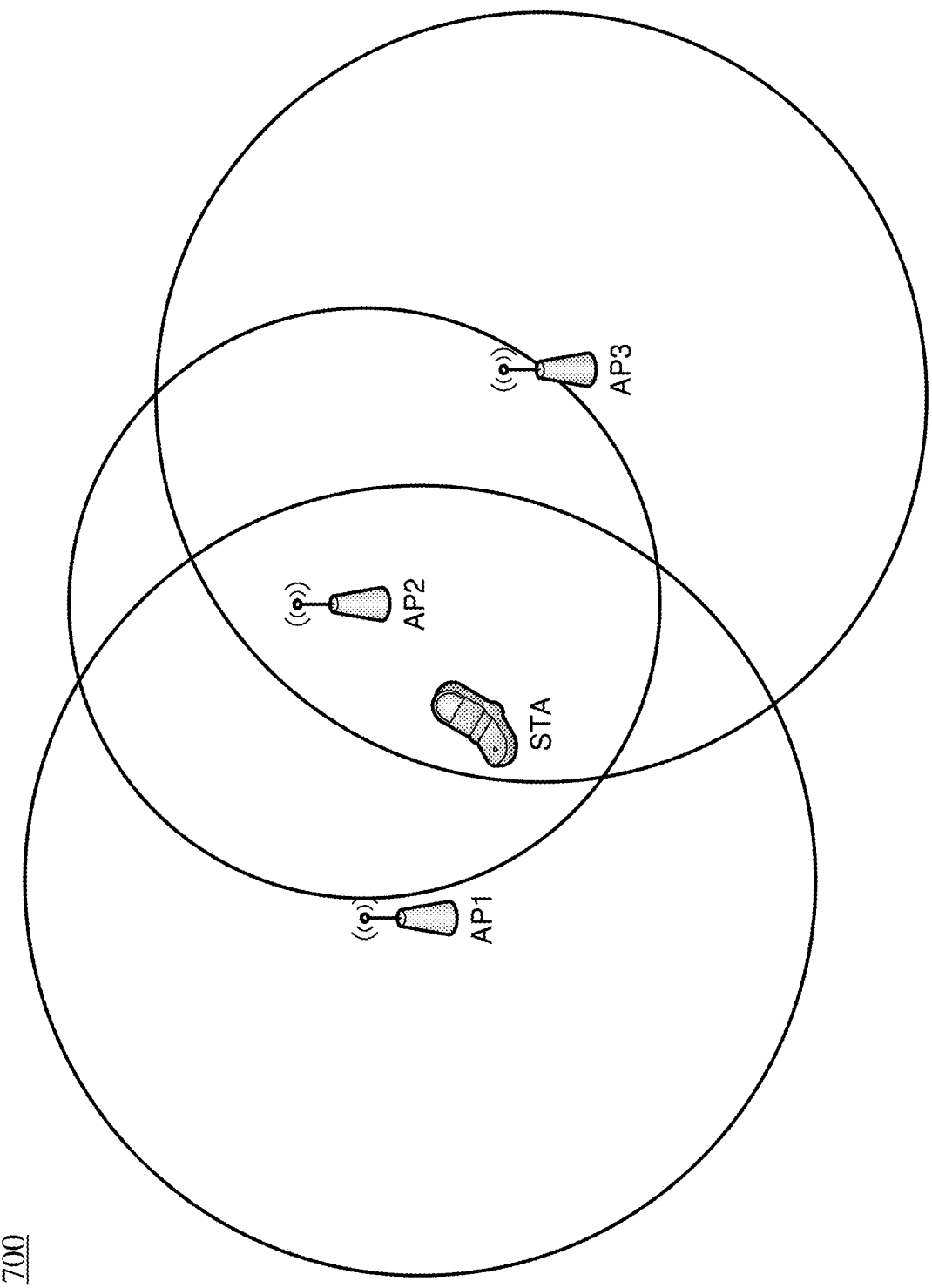
FIG. 7A illustrates an example multi-AP system 700 in accordance with one or more embodiments of the disclosed technology.
Figure 7B:
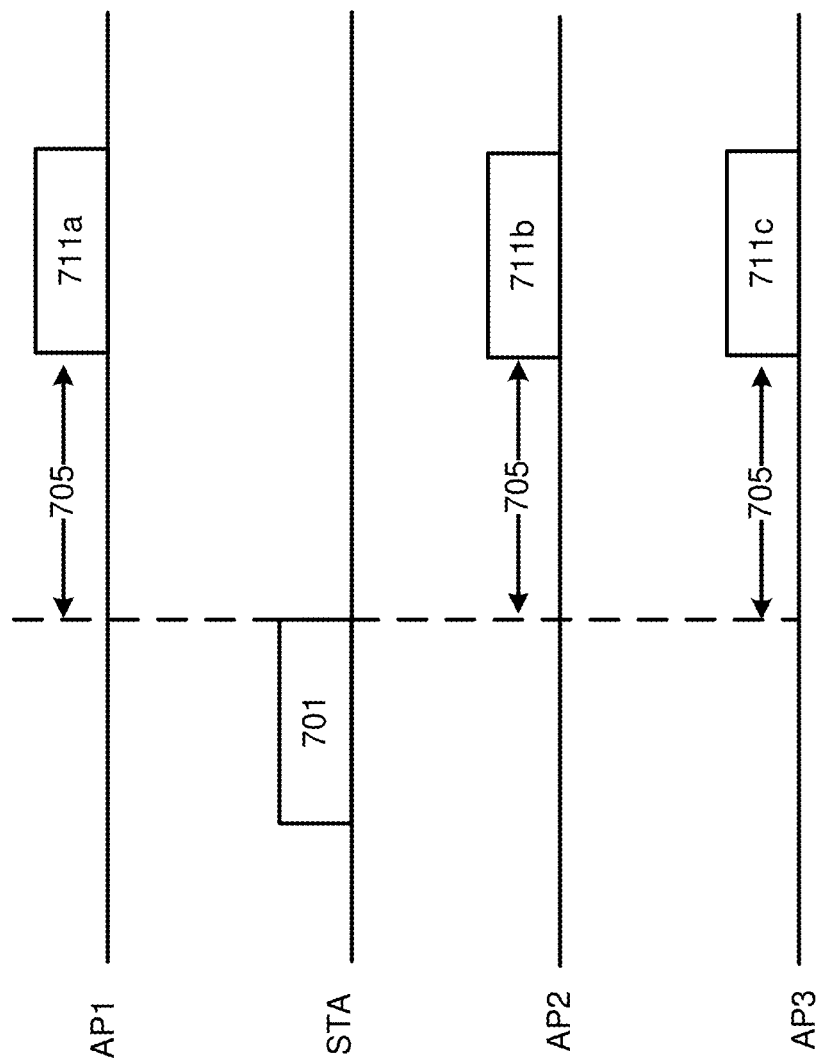
FIG. 7B illustrates an example of transmission corresponding to FIG. 7A in accordance with one or more embodiments of the disclosed technology.

FIGS. 7A-7B illustrate an example multi-AP system 700 in accordance with one or more embodiments of the disclosed technology. The multi-AP system 700 comprises three APs. AP1 is an M-AP, and AP2 and AP3 are S-APs. In this embodiment, STA is located within an overlapped area of all the APs. Therefore, STA can initiate joint transmissions by multiple APs on its own.

After STA gains access to the medium using a contention-based protocol, STA sends a scheduling frame 701 to two or more APs (e.g., AP1 and AP2, AP1 and AP3, AP2 and AP3, or all three APs) simultaneously to enable joint transmissions. In this particular embodiment, STA sends the scheduling frame 701 to all three APs to enable joint transmissions. The scheduling frame 701 can be a newly defined frame, such as a CT frame. The scheduling frame 701 can also leverage an existing frame format to include the scheduling information. The scheduling frame 701 includes scheduling information for the intended APs (e.g., AP1 and AP2, AP1 and AP3, AP2 and AP3, or all three APs), such as parameters required by the PHY layer and the MAC layer of the intended APs. The scheduling information can help synchronize the transmissions by the APs (e.g., AP1 and AP2, AP1 and AP3, AP2 and AP3, or all three APs). The scheduling frame 701 also includes the parameters of the data service requested by STA.

In some embodiments, the scheduling frame 701 includes a sequence number of the first data frame to be transmitted. In some embodiments, the scheduling frame 701 includes a buffer address of the data frames to be transmitted. The scheduling frame 701 may also indicate a status of the buffer in which the data frames are stored.

After AP1 receives the scheduling frame 701, AP1 obtains the scheduling information of AP1 after decoding the frame. After a time interval 705 (e.g., SIFS), AP1 sends a joint transmission radio frame 711a as requested by the STA. During the time interval 705, the AP1 suspends any Clear Channel Assessment (CCA).

Similarly, after AP2 and AP3 each receives the scheduling frame 701, the respective AP (AP2 or AP3) obtains the scheduling information of the corresponding AP after decoding the frame. After a time interval 705 (e.g., SIFS), the corresponding AP sends a joint transmission radio frame 711*b*, 771*c* as requested by the STA. During the time interval 705, the APs suspend any Clear Channel Assessment (CCA).

When an AP (e.g., AP1, AP2, or AP3) fails to receive the scheduling frame 701, the AP continues to complete the current process and does not perform joint transmission with the remaining AP(s).

Embodiment 5

Figure 8A:
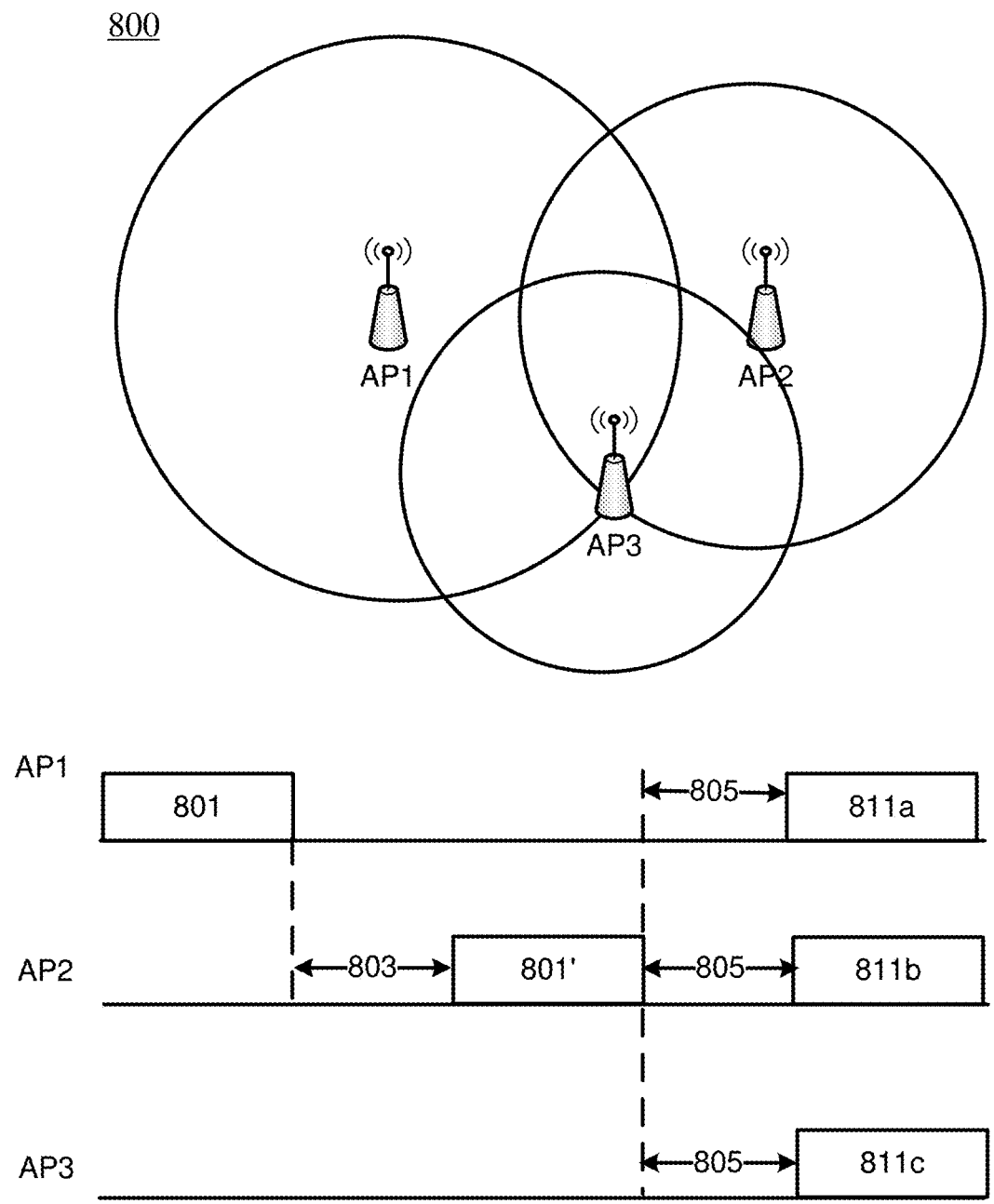
FIG. 8A illustrates another example multi-AP system in accordance with one or more embodiments of the disclosed technology.
Figure 8B:
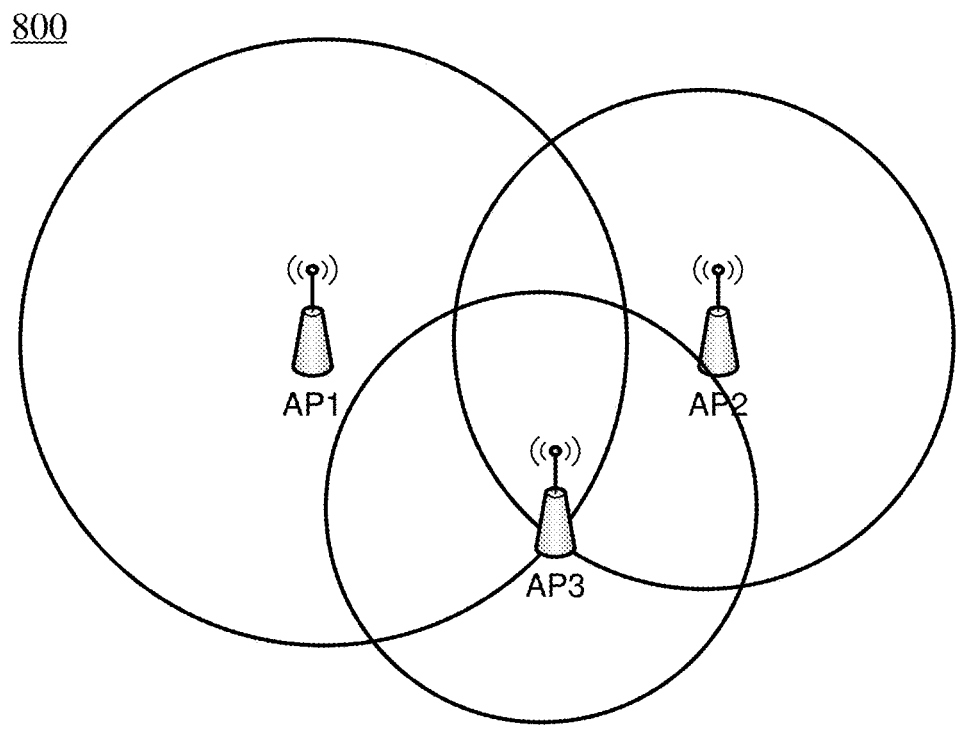
FIG. 8B illustrates another example multi-AP system in accordance with one or more embodiments of the disclosed technology.
Figure 8B:
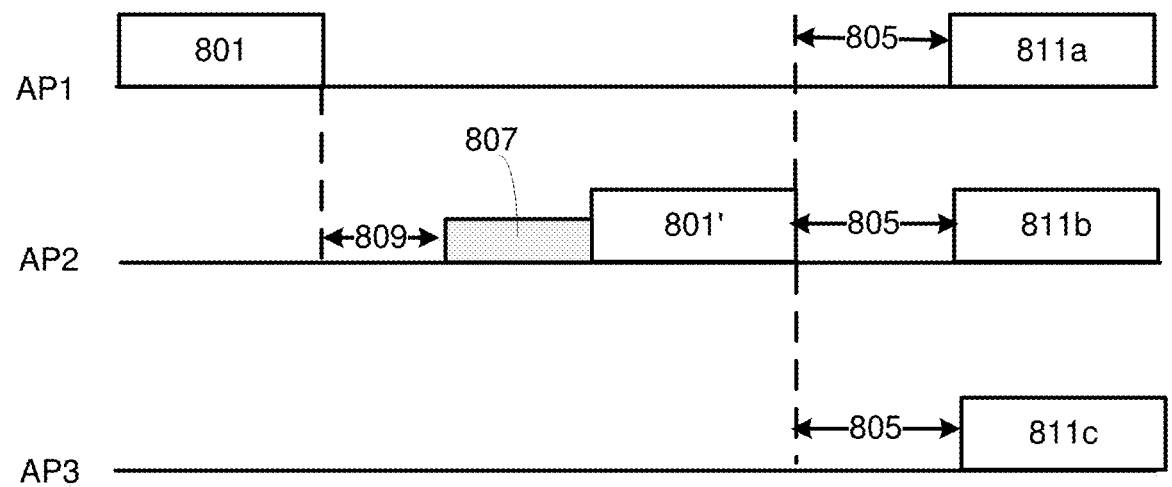

FIGS. 8A-8B illustrate an example multi-AP system 800 in accordance with one or more embodiments of the disclosed technology. The multi-AP system 800 comprises three APs. AP1 is an M-AP. AP2 and AP3 are S-APs. One S-AP can be used to relay information from M-AP to the S-AP(s).

After AP1 gains access to the medium using a contention-based protocol, AP1 sends a scheduling frame 801 to AP2 to enable joint transmissions among AP1, AP2, and AP3. The scheduling frame 801 can be a newly defined frame, such as a CT frame. The scheduling frame 801 can also leverage an existing frame format to include the scheduling information. The scheduling frame 801 includes scheduling information for the AP2 and AP3, such as parameters required by the PHY layer and the MAC layer of AP2 and AP3. The scheduling information can help synchronize the transmissions by the APs (AP1, AP2, and AP3). The scheduling frame 801 also includes a frame forwarding indication to direct the AP2 to forward/relay the scheduling information.

In some embodiments, the scheduling frame 801 includes a sequence number of the first data frame to be transmitted. In some embodiments, the scheduling frame 801 includes a buffer address of the data frames to be transmitted. The scheduling frame 801 may also indicate a status of the buffer in which the data frames are stored.

After receiving the scheduling frame 801, the AP2 determines, based on the frame forwarding indication, that the information in the scheduling frame 801 needs to be forwarded to AP2. The AP2 then generates a new scheduling frame 801' by partially or completely copying the received frame 501. The AP2 then performs either of the following operations:

1. As shown in FIG. 8A, the AP2 relays the scheduling information to AP3 by sending the new scheduling frame 801' after a time interval 803 (e.g., SIFS). During the time interval 803, the AP2 refrains from performing any carrier sensing (CS) operations, such as energy detect (ED)-based Clear Channel Assessment (CCA) or virtual CS detection.

2. As shown in FIG. 8B, the AP2 contends the medium using an access category for transmitting the scheduling frame 801'. After gaining medium access, the STA transmits the scheduling information to AP2 by sending the new scheduling frame 801' after a back-off interval 807. It is noted that the priority level associated with the access category is high enough to ensure that the length of a time interval, such as the arbitration interframe space (AIFS), plus the back-off interval is shorter than a life time of the data buffered in the AP3.

After receiving the scheduling frame, the AP1 detects that it is a frame forwarded by the AP2 and sends a joint transmission radio frame to a target station after a time interval 805 (e.g., SIFS). During the time interval 805, AP1 suspends any Clear Channel Assessment (CCA).

After AP3 receives the scheduling frame 801', AP3 obtains the scheduling information after decoding the frame. After a time interval 805 (e.g., SIFS), AP3 sends a joint transmission radio frame 811*b* to the target station. During the time interval 805, the AP2 suspends any Clear Channel Assessment (CCA).

When AP3 fails to receive the scheduling frame 801', AP3 continues to complete the current process and does not perform joint transmission with AP1.

Embodiment 6

Figure 9:
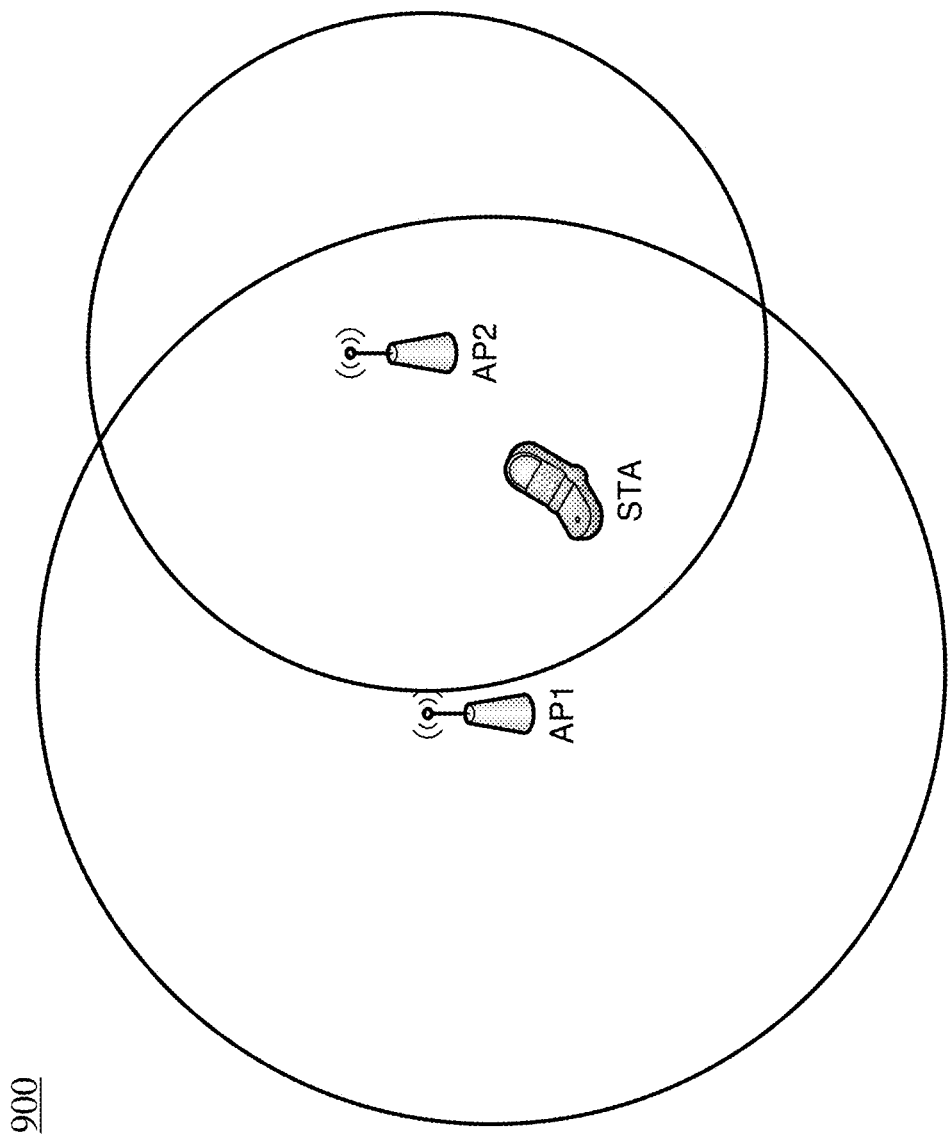
FIG. 9 illustrates yet another example multi-AP system in accordance with one or more embodiments of the disclosed technology.

FIG. 9 illustrate an example multi-AP system 900 in accordance with one or more embodiments of the disclosed technology. The multi-AP system 900 comprises two APs. AP1 is an M-AP, and AP2 is an S-AP. An STA can be used to relay information from M-AP to the S-AP.

After AP1 gains access to the medium using a contention-based protocol, AP1 sends a scheduling frame to AP2 to enable a joint transmission. The scheduling frame can be a newly defined frame, such as a CT frame. The scheduling frame can also leverage an existing frame format to include the scheduling information. The scheduling frame includes scheduling parameters and/or frame forwarding indication. In some embodiments, the scheduling frame includes a sequence number of the first data frame that the M-AP expects the S-AP to transmit jointly.

In some embodiments, the scheduling parameters include a Resource Unit (RU) information to indicate the RU to be used by the S-AP to perform joint transmission with the M-AP to the STA. In some embodiments, the frame forwarding indication indicates whether the scheduling frame sent by the M-AP needs to be forwarded by one or more intermediate devices. The frame forwarding indication can include parameters such as a MAC address of the forwarding device and/or an indicator indicating whether the frame is a forwarded frame.

In this example, AP2 receives the scheduling frame and decodes the forwarding indication. AP2 learns that the forwarding operation is not required. AP2 then decodes the RU information in the frame and determines a joint transmission to a specific station is to be performed after a specific time (e.g., SIFS) using the specified RU(s). AP2 also obtains the sequence number of the first data frame to be transmitted to the specific STA. The foregoing operations are all completed within the specific time (e.g., SIFS). AP2 then performs the joint transmission according to the information in the scheduling frame.

In some cases, one or more intermediate devices are needed to forward the scheduling frame. When an intermediate device receives the scheduling frame, it decodes the forwarding indication and determines that it needs to perform the forwarding operation. The intermediate device completely or partially copies the scheduling parameters and/or the sequence number of the first data frame that the M-AP expects the S-AP to transmit jointly to generate a new frame. The new frame can be marked as a forwarded frame and be transmitted to other intermediate device(s) or AP2. After AP2 receives the forwarded frame, AP2 performs similar operations to transmit the data frames according to the information in the scheduling frame.

Figure 10:
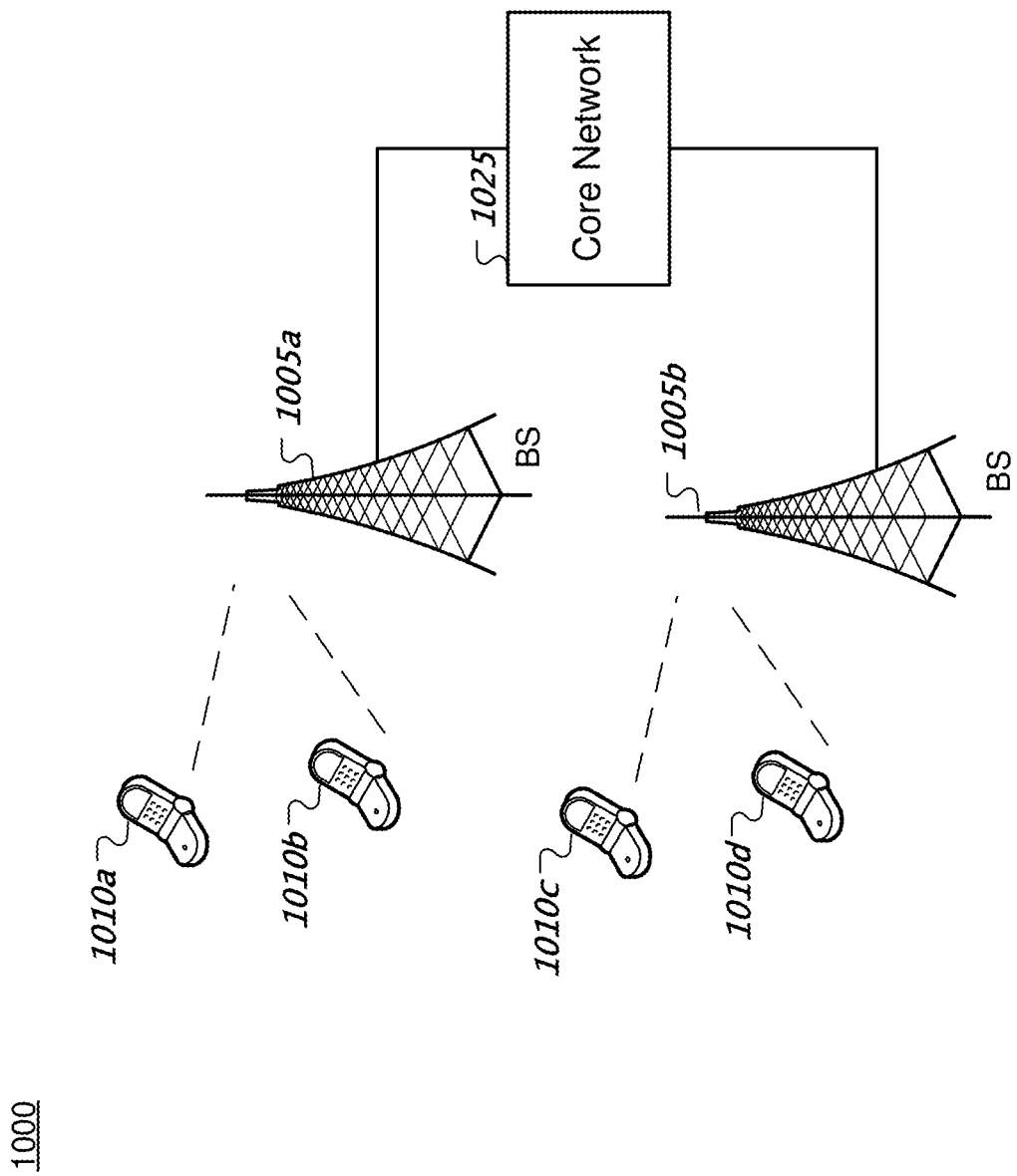
FIG. 10 shows an example of a wireless communication system where techniques in accordance with one or more embodiments of the present technology can be applied.

FIG. 10 shows an example of a wireless communication system 1000 where techniques in accordance with one or more embodiments of the present technology can be applied. A wireless communication system 1000 can include one or more base stations (BSs) 1005*a*, 1005*b*, one or more wireless devices 1010*a*, 1010*b*, 1010*c*, 1010*d*, and a core network 1025. A base station 1005a, 1005b can provide wireless service to wireless devices 1010a, 1010b, 1010c and 1010d in one or more wireless sectors. In some implementations, a base station 1005a, 1005b includes directional antennas to produce two or more directional beams to provide wireless coverage in different sectors.

The core network 1025 can communicate with one or more base stations 1005a, 1005b. The core network 1025 provides connectivity with other wireless communication systems and wired communication systems. The core network may include one or more service subscription databases to store information related to the subscribed wireless devices 1010a, 1010b, 1010c, and 1010d. A first base station 1005a can provide wireless service based on a first radio access technology, whereas a second base station 1005b can provide wireless service based on a second radio access technology. The base stations 1005a and 1005b may be co-located or may be separately installed in the field according to the deployment scenario. The wireless devices 1010a, 1010b, 1010c, and 1010d can support multiple different radio access technologies.

Figure 11:
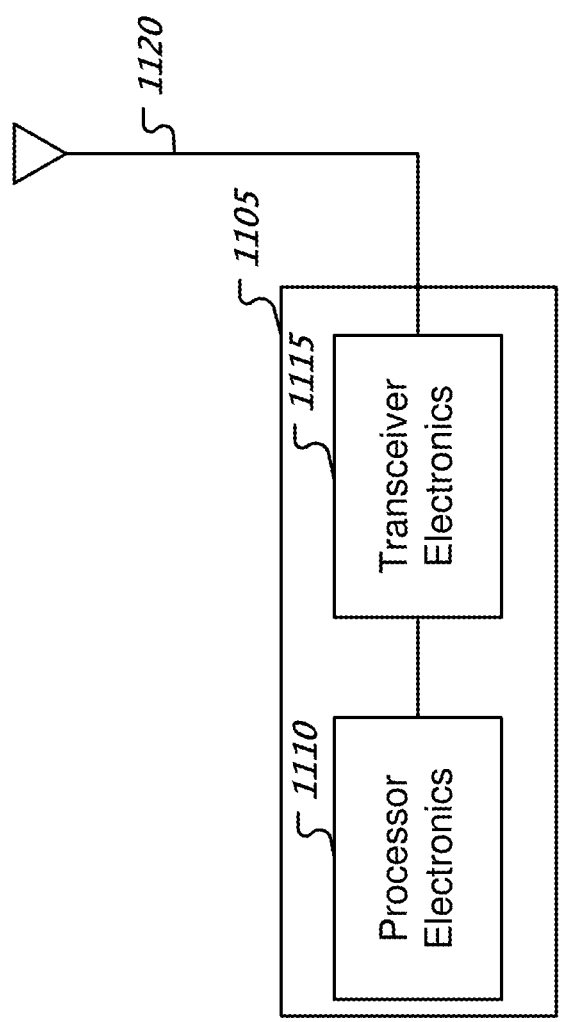
FIG. 11 is a block diagram representation of a portion of a radio station in accordance with one or more embodiments of the present technology can be applied.

FIG. 11 is a block diagram representation of a portion of a radio station. A radio station 1105 such as a base station or a wireless device (or UE) can include processor electronics 1110 such as a microprocessor that implements one or more of the wireless techniques presented in this document. The radio station 1105 can include transceiver electronics 1115 to send and/or receive wireless signals over one or more communication interfaces such as antenna 1120. The radio station 1105 can include other communication interfaces for transmitting and receiving data. Radio station 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio station 1105.

It will be appreciated that the present document discloses techniques that can be embodied into wireless communication systems to facilitate synchronization among multiple APs for joint transmissions. Using the disclosed techniques, an AP or a station can relay scheduling information about a joint transmission to another AP. A station can also initiate a joint transmission on its own and synchronize the joint transmission using scheduling frames.

In one example aspect, a wireless communication method includes receiving, by a communication device, a first frame from a first network device. The first network device is a master access point or a first intermediate device (e.g., an intermediate AP/STA). The first frame indicates a joint transmission to be performed by multiple access points. The first frame includes a scheduling information for a secondary access point to perform the joint transmission and an indicator directing the communication device to forward the scheduling information. The method also includes transmitting, by the communication device, a second frame to a second network device. The second network device is the secondary access point or a second intermediate device (e.g., an intermediate AP/STA). The second frame includes the scheduling information for the secondary access point to perform the joint transmission.

In some embodiments, the transmitting comprises transmitting, after a predetermined time duration, the second frame by the communication device to the secondary access point or the second intermediate communication device. In some embodiments, the predetermined time duration is Shortest Interface Space (SIFS). In some embodiments, the method further comprises transmitting, by the communication device, the second frame to the master access point after the predetermined time duration.

In some embodiments, the scheduling information comprises one or more physical layer transmission parameters or one or more medium-access-control (MAC) layer transmission parameters of the communication device or the second intermediate communication device. In some embodiments, the first frame indicates a sequence number of a data frame to be transmitted, a buffer address of the data frame to be transmitted, or a buffer status of the secondary access point. In some embodiments, the scheduling information includes information about a resource unit to be used by the secondary access point to perform the joint transmission.

In some embodiments, the method further comprises contending, by the communication device, a medium using an access category for transmitting the second frame. A length of an arbitration interframe space (AIFS) plus a back-off time under the access category is shorter than a life time of data buffered in the second access point.

In some embodiments, the communication device includes a station. In some embodiments, the communication device includes a third access point. The method further comprises transmitting, by the communication device, a joint transmission radio frame to a target station after a predetermined time duration subsequent to transmitting the second frame. In some embodiments, the first frame includes a second scheduling information for the communication device to perform the joint transmission, the second scheduling information comprising the one or more physical layer transmission parameters or the one or more MAC layer transmission parameters of the communication device.

In another example aspect, a wireless communication method includes accessing a medium by a station for performing a transmission and transmitting, by the station, a frame to multiple access points indicating a joint transmission to be performed by the multiple access points. The frame includes scheduling information for the multiple access points for performing the joint transmission.

In some embodiments, the scheduling information includes one or more physical layer transmission parameters or one or more medium-access-control (MAC) layer transmission parameters of the multiple access points.

In another example aspect, a wireless communication method includes receiving, by an access point, a frame from a communication device indicating a joint transmission to be performed by the access point. The frame includes a scheduling information for the access point. The method also includes transmitting, after a predetermined time duration, a joint transmission radio frame to a target station based on the scheduling information.

In some embodiments, the method comprises suspending, by the access point, a Clear Channel Assessment (CCA) in the predetermined time duration after receiving the frame. The predetermined time duration can be Shortest Interface Space (SIFS).

In some embodiments, the scheduling information includes information about a resource unit to be used by the secondary access point to perform the joint transmission. In some embodiments, the communication device includes the station or a second access point. The scheduling information comprises one or more physical layer transmission parameters or one or more medium-access-control (MAC) layer transmission parameters of the access point.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A wireless communication method, comprising: receiving, by a communication device jointly with an other communication device, a first frame from a first network device indicating a joint transmission to be performed by multiple access points, wherein the first frame includes a scheduling information for a secondary access point to perform the joint transmission and an indicator directing the communication device to forward the scheduling information;
generating, by the communication device jointly with the other communication device, respective second frames where each second frame is a partial or complete copy of the first frame; and
transmitting, by the communication device jointly with the other communication device, the second frames to a second network device, wherein the second frames include the scheduling information for the secondary access point to perform the joint transmission in response to detecting at least one of the second frames.

2. The method of claim 1, wherein the first network device is a master access point or a first intermediate device, and wherein the second network device is the secondary access point or a second intermediate device.

3. The method of claim 1, wherein the transmitting comprises: transmitting, after a predetermined time duration, the second frames by the communication device and the other communication device to the second network device, wherein the predetermined time duration is a Shortest Interface Space (SIFS).

4. The method of claim 1, wherein the scheduling information comprises one or more physical layer transmission parameters, one or more medium-access-control (MAC) layer transmission parameters of the communication device or the second network device, or information about a resource unit to be used by the secondary access point to perform the joint transmission.

5. The method of claim 1, wherein the first frame indicates a sequence number of a data frame to be transmitted, a buffer address of the data frame to be transmitted, or a buffer status of the secondary access point.

6. The method of claim 1, further comprising: contending, by the communication device, for a medium using an access category for transmitting the respective second frame, wherein a length of an arbitration interframe space (AIFS) plus a back-off time under the access category is shorter than a lifetime of data buffered in the secondary access point.

7. The method of claim 1, wherein the communication device includes a third access point, the method further comprising: transmitting, by the communication device, a joint transmission radio frame to a target station after a predetermined time duration subsequent to transmitting the respective second frame.

8. A wireless communication method, comprising: receiving, by an access point, a frame from a communication device indicating a joint transmission to be performed by the access point, wherein the frame includes a scheduling information for the access point;
   suspending, by the access point, a Clear Channel Assessment (CCA) in a predetermined time duration after receiving the frame, wherein the predetermined time duration is a Shortest Interface Space (SIFS); and
   transmitting, after the predetermined time duration, a joint transmission radio frame to a target station based on the scheduling information.

9. The method of any of claims 8, wherein the scheduling information includes information about a resource unit to be used by the access point to perform the joint transmission, a physical layer transmission parameter, or a medium-access control (MAC) layer transmission parameter of the access point.

10. A wireless communication system comprising:
    a first wireless communication apparatus comprising a first processor and a first memory storing first instructions;
    a second wireless communication apparatus comprising a second processor and a second memory storing second instructions,
    wherein, the first and second instructions, upon execution, by the respective first and second processors, cause the respective first and second wireless communication apparatuses to:
    jointly receive a first frame from a first network device indicating a joint transmission to be performed by multiple access points, wherein the first frame includes a scheduling information for a secondary access point to perform the joint transmission and an indicator directing each of the first and second wireless communication apparatuses to forward the scheduling information;
    jointly generate respective second frames where each second frame is a partial or complete copy of the first frame; and
    jointly transmit the second frames to a second network device, wherein the second frames include the scheduling information for the secondary access point to perform the joint transmission in response to detecting at least one of the second frames.

11. The system of claim 10, wherein the first network device is a master access point or a first intermediate device, and wherein the second network device is the secondary access point or a second intermediate device.

12. The system of claim 10, wherein, for each of the first and second wireless communication apparatuses, the respective second frame is transmitted to the second network device after a predetermined time duration, and wherein the predetermined time duration is a Shortest Interface Space (SIFS).

13. The system of claim 10, wherein the scheduling information comprises one or more physical layer transmission parameters, one or more medium-access-control (MAC) layer transmission parameters of the apparatus or the second network device, or information about a resource unit to be used by the secondary access point to perform the joint transmission.

14. The system of claim 10, wherein the first frame indicates a sequence number of a data frame to be transmitted, a buffer address of the data frame to be transmitted, or a buffer status of the secondary access point.

15. The system of claim 10, wherein each of the first and second wireless communication apparatuses is further caused to:
    contend for a medium using an access category for transmitting the second frame, wherein a length of an arbitration interframe space (AIFS) plus a back-off time under the access category is shorter than a lifetime of data buffered in the secondary access point.

16. The system of claim 10, further comprising:
    a target station,
    wherein each of the first and second network devices is configured to transmit a joint transmission radio frame to the target station after a predetermined time duration subsequent to the transmitting of the second frames.

17. A wireless communication apparatus comprising a processor and a memory storing instructions, which when executed by the processor causes the apparatus to:
    receive a frame from a communication device indicating a joint transmission to be performed by the apparatus, wherein the frame includes a scheduling information for the apparatus;
    suspend a Clear Channel Assessment (CCA) in a predetermined time duration after receiving the frame, wherein the predetermined time duration is a Shortest Interface Space (SIFS); and
    transmit, after the predetermined time duration, a joint transmission radio frame to a target station based on the scheduling information.

18. The apparatus of claim 17, wherein the scheduling information includes information about a resource unit to be used by the apparatus to perform the joint transmission, a physical layer transmission parameter, or a medium-access control (MAC) layer transmission parameter of the apparatus.

* * * * *